United States Patent [19]

Chu et al.

[11] 4,408,254
[45] Oct. 4, 1983

[54] THIN FILM CAPACITORS

[75] Inventors: Wei-Kan Chu, Poughkeepsie; James K. Howard, Fishkill, both of N.Y.

[73] Assignee: International Business Machines Corporation, Armomk, N.Y.

[21] Appl. No.: 322,360

[22] Filed: Nov. 18, 1981

[51] Int. Cl.³ .............................................. H01G 4/20
[52] U.S. Cl. .................................... 361/321; 361/326; 428/472; 501/32; 501/41; 501/136; 501/137
[58] Field of Search ....................... 361/320, 321, 326; 501/32, 41, 136, 137; 428/472

[56] References Cited

U.S. PATENT DOCUMENTS 3,723,838  3/1973  Kumagai .
3,847,658  11/1974  Kumagai .
3,976,511  8/1976  Johnson .
4,119,554  10/1978  Fujiwara .

Primary Examiner—Elliot A. Goldberg
Attorney, Agent, or Firm—Joseph G. Walsh

[57] ABSTRACT

A capacitor is formed by placing between two electodes a thin film of amorphous titanate which has been ion implanted with noble gas ions.

4 Claims, 1 Drawing Figure

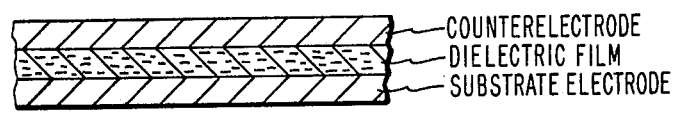

THIN FILM CAPACITORS

TECHNICAL FIELD

The present invention is concerned with thin film capacitors. More particularly, it is concerned with capacitors containing a dielectric film obtained by ion implanting an amorphous titanate with noble gas ions.

PRIOR ART

High dielectric titanate films have been formed in the past by either deposition at high temperature or by post-deposition heat treatment. These fabrication techniques, however, involve prolonged exposure to heat, which can change the film composition and cause degradation of the capacitance.

U.S. Pat. No. 4,119,554 shows increasing of the dielectric constant of a basic ternary composition by incorporating an alkali metal oxide therein.

U.S. Pat. No. 3,976,511 teaches formation of an integrated circuit using ion bombardment.

U.S. Pat. Nos. 3,723,838 and 3,847,658 both relate to thin film capacitors of beta tantalum which has been nitrogen doped.

As far as we are aware, however, none of the prior art suggests the increasing of the dielectric constant of a titanate film by ion implantation of noble gas ions.

DISCLOSURE OF THE INVENTION

According to the present invention, a film of amorphous titanate is subjected to ion implantation using noble gas ions. The dielectric constant of the titanate is increased. The resulting thin films make capacitors when spaced between two electrodes.

The titanates used in the present invention include calcium, barium, strontium, lead and zirconium titanates as well as lead zirconate titanate (PZT) and lead zirconate-lanthanum modified titanate (PZLT). Prior to ion implantation these materials are in the amorphous state. To fabricate a thin film capacitor a film of the titanate is first placed on a substrate electrode. The thickness of the film is on the order of about 150 nm. The film is then subjected to ion implantation using ions of the noble gases, that is, ions of helium, neon, argon, krypton or xenon. In general, the heaviest ion species are the most preferred. The energy of the implantation is selected so that the maximum damage to the amorphous film is in and around the middle thickness of the film. In the case of relatively thick films, multiple energy implantations may be needed. The ion implantation technique per se is conventional and has been described often in the literature.

Although we do not wish to be bound by it, it is our belief that the ion implantation produces thermal spikes during the collision cascade to alter the structure of the amorphous titanate and thereby increase the dielectric constant.

BRIEF DESCRIPTION OF THE DRAWING

The drawing (not to scale) shows a thin film capacitor according to the present invention. A substrate electrode and a counter electrode are separated by a dielectric film.

The following examples are given solely for the purposes of illustration and are not to be considered a limitation on the invention, many variations of which are possible without departing from the spirit or scope thereof.

A 1500 A° thick layer of $BaTiO_3$ was RF sputtered in $Ar-10\%O_2$ at 500 watts; the cross-section of sample consisted of oxidized Si, coated with 1500 A° of sputtered TiW (90% W–10% Ti by weight). The $BaTiO_3$ film was implanted with $Ar^+$ (120 Kv) at different dose levels in different areas: $2 \times 10^{15}$ in area I, $6 \times 10^{15}$ in Area II, $4 \times 10^{15}$ ions/cm$^2$ in Area II); the same wafer was used for 3 dose levels and control (no implant) in Area IV.

Area II showed an increase in capacitance after implant $6 \times 10^{15}$ (Al dots 20 mil diameter were deposited on $BaTiO_3$ after implant to measure capacitance and leakage). Dielectric constant increases from $E=15$ for amorphous $BaTiO_3$ (Area IV, control) to $E=50$ in $6 \times 10^{15}$ region).

The leakage current was measured from $10^{-4}$ Amps to $10^{-12}$ amps (0.5 volts to 6.5 volts). Area II ($6 \times 10^{15}$) yields higher leakage than Areas I, III, IV. This is because the higher dielectric constant $E=50$ of Area II indicates a larger grain (highly ordered) film than Areas I, III, IV, thus the more crystalline the film, the higher the leakage. For example, at 2 volts, Area II ($6 \times 10^{15}$) yields approximately $2 \times 10^{-9}$ amp leakage compared to approximately $5 \times 10^{-11}$ amps for the leakage in Areas I, III and IV.

The sample was annealed at 500° C. in Argon and retested the Areas I→IV. The high dose ($6 \times 10^{15}$) area yielded an average capacitance of 1190 pF (picoFarads or $1190 \times 10^{-12}$ farads) which corresponds to a dielectric of $E=100$, whereas the lower dose ($\leq 6 \times 10^{15}$) show $C=216$ pF (a slight increase over 175 pF before anneal) which corresponds to a dielectric constant $E=18$.

The leakage increased (in II) to approximately $7 \times 10^{-8}$ amps at 2 V after heat treatment, which is consistent with further grain growth.

We claim:

1. A thin film capacitor comprising a substrate electrode, a dielectric film on said electrode with said film comprising an amorphous titanate implanted with noble gas ions, and a counterelectrode opposing said substrate electrode and spaced therefrom by said dielectric film.

2. A capacitor as claimed in claim 1 wherein said dielectric is a titanate of calcium, barium, strontium, lead or zirconium.

3. A capacitor as claimed in claim 1 wherein noble gas ions are implanted at a concentration of about $6 \times 10^{15}$ ions per square cm of film area.

4. A capacitor as claimed in claim 1 where the noble gas is argon.

* * * * *